(12) United States Patent
Ku et al.

(10) Patent No.: US 10,606,163 B2
(45) Date of Patent: Mar. 31, 2020

(54) PROJECTION SCREEN CONFIGURED TO BE PROJECTED WITH MULTI-ANGLE IMAGES

(71) Applicant: Elite Screens Material Ltd., New Taipei (TW)

(72) Inventors: Chia-Chen Ku, New Taipei (TW); Rong-Lin Hsu, New Taipei (TW)

(73) Assignee: ELITE SCREENS MATERIAL LTD., New Taipei (TW)

( * ) Notice: Subject to any disclaimer, the term of this patent is extended or adjusted under 35 U.S.C. 154(b) by 0 days.

(21) Appl. No.: 16/180,043

(22) Filed: Nov. 5, 2018

(65) Prior Publication Data
US 2019/0324363 A1 Oct. 24, 2019

(30) Foreign Application Priority Data
Apr. 20, 2018 (TW) .............................. 107113437 A

(51) Int. Cl.
*G03B 21/60* (2014.01)
*G03B 21/56* (2006.01)
(Continued)

(52) U.S. Cl.
CPC ............ *G03B 21/60* (2013.01); *G03B 21/10* (2013.01); *G03B 21/56* (2013.01); *G03B 21/567* (2013.01); *G03B 21/58* (2013.01); *G03B 21/62* (2013.01)

(58) Field of Classification Search
CPC .................................................. G03B 21/56
(Continued)

(56) References Cited

U.S. PATENT DOCUMENTS 1,568,023 A * 12/1925 McManus .............. G03B 21/60
 359/459
1,610,423 A * 12/1926 Cawley ................ G03B 21/604
 264/1.34
(Continued)

FOREIGN PATENT DOCUMENTS

CN 106054513 A 10/2016
JP 1999194424 * 1/1999 ............. G03B 21/60
(Continued)

*Primary Examiner* — Clayton E. LaBalle
*Assistant Examiner* — Kevin C Butler
(74) *Attorney, Agent, or Firm* — Bacon & Thomas, PLLC

(57) ABSTRACT

A projection screen configured to be projected with multi-angle images includes a base membrane and a coating layer. The base membrane includes a body layer and a plurality of toothed portions connected with the body layer. A profile of each of the toothed portions includes at least one first plane and at least one second plane, where the first plane and the second plane each has a reflection angle different from each other, for providing multi-angle images of projection. The coating layer includes a reflection layer and a light-absorbing layer, where the reflection layer is disposed on the profile of each of the toothed portions; whereas the light-absorbing layer is disposed on the reflection layer, such that, as viewed from a projection position, the coating layer is disposed behind the base membrane. Thereby, the projection screen not only can provide multi-angle images of projection under the circumstance of maintaining the capability of resisting ambient light, but also can prevent the coating layer from contact and abrasion by human behaviors when in use, and as such, the life of use can be prolonged.

7 Claims, 7 Drawing Sheets

(51) Int. Cl.
*G03B 21/62* (2014.01)
*G03B 21/58* (2014.01)
*G03B 21/10* (2006.01)

(58) Field of Classification Search
USPC .......................................................... 359/449
See application file for complete search history.

(56) References Cited

U.S. PATENT DOCUMENTS

| | | | | |
|---|---|---|---|---|
| 1,791,936 A * | 2/1931 | Rolph | ....................... | F21V 7/00 359/528 |
| 5,363,237 A * | 11/1994 | Wakatake | .............. | G02B 5/045 359/546 |
| 5,416,637 A * | 5/1995 | Wakatake | ................ | G09F 13/16 359/546 |
| 6,443,579 B1 * | 9/2002 | Myers | .................... | G02B 5/045 359/601 |
| 6,574,041 B1 * | 6/2003 | Chen | ....................... | G03B 21/60 359/449 |
| 6,744,558 B2 * | 6/2004 | Tanaka | ................... | G03B 21/62 359/460 |
| 6,842,282 B2 * | 1/2005 | Kuroda | ................ | G03B 21/602 359/449 |
| 7,110,176 B2 * | 9/2006 | Maruta | ................ | G03B 21/602 359/443 |
| 7,317,572 B2 * | 1/2008 | Sekiguchi | ............ | G03B 21/625 359/453 |
| 7,467,872 B2 * | 12/2008 | Hisada | ................... | G02B 13/16 353/77 |
| 7,499,214 B2 * | 3/2009 | Novet | .................... | G03B 21/60 359/459 |
| 7,532,396 B2 * | 5/2009 | Yonekubo | .............. | G03B 21/60 359/459 |
| 7,570,423 B2 * | 8/2009 | Willard | .................. | G03B 21/56 359/459 |
| 7,696,589 B2 * | 4/2010 | May | ..................... | G02B 5/0221 257/432 |
| 7,826,135 B2 * | 11/2010 | Destain | ................. | G03B 21/60 359/449 |
| 8,111,457 B2 * | 2/2012 | Akiyama | ................ | C23C 14/04 359/443 |
| 8,218,236 B2 * | 7/2012 | Shiau | ..................... | G03B 21/60 359/443 |
| 8,218,237 B2 * | 7/2012 | Liu | ........................ | G03B 21/62 359/443 |
| 9,927,690 B2 * | 3/2018 | Su | ......................... | G03B 21/602 |
| 2002/0126378 A1 * | 9/2002 | Cho | ....................... | G03B 21/56 359/443 |
| 2005/0180004 A1 * | 8/2005 | Sekiguchi | ................ | G02B 3/08 359/457 |
| 2005/0185279 A1 * | 8/2005 | Mullen | .................. | G02B 5/124 359/530 |
| 2005/0200952 A1 * | 9/2005 | Niwa | ..................... | G03B 21/60 359/459 |
| 2005/0237610 A1 * | 10/2005 | Sekiguchi | .............. | G03B 21/10 359/457 |
| 2006/0001963 A1 * | 1/2006 | Ishikawa | .................. | G02B 3/08 359/457 |
| 2006/0109549 A1 * | 5/2006 | Shimizu | ................. | G03B 21/10 359/457 |
| 2008/0030882 A1 * | 2/2008 | Ichikawa | ............... | G03B 21/60 359/839 |
| 2008/0297895 A1 * | 12/2008 | Fujita | ..................... | G03B 21/60 359/459 |
| 2011/0176209 A1 * | 7/2011 | Kitabayashi | ........... | G03B 21/60 359/459 |
| 2011/0249200 A1 * | 10/2011 | Shimizu | ............... | G03B 21/602 348/744 |
| 2012/0274910 A1 * | 11/2012 | Kim | ....................... | G03B 21/602 353/79 |
| 2014/0036359 A1 * | 2/2014 | Jeon | ...................... | G03B 21/60 359/459 |
| 2015/0286124 A1 * | 10/2015 | Kim | ....................... | G03B 21/60 359/449 |
| 2015/0370156 A1 * | 12/2015 | Kim | ....................... | G03B 21/60 359/458 |
| 2016/0334697 A1 * | 11/2016 | Kim | ....................... | G03B 21/60 |
| 2017/0242329 A1 * | 8/2017 | Chien | .................. | G03B 21/602 |
| 2017/0248839 A1 * | 8/2017 | Maruta | .................. | G03B 21/60 |
| 2018/0321577 A1 * | 11/2018 | Yanai | ..................... | G03B 21/60 |

FOREIGN PATENT DOCUMENTS

| | | | | |
|---|---|---|---|---|
| JP | 2000206620 | * | 7/2000 | .............. G02B 5/02 |
| JP | 2002019385 | * | 1/2002 | .............. B43L 1/04 |
| JP | 2004078024 | * | 3/2004 | ............. G03B 21/60 |
| TW | M374077 | * | 9/2009 | ............. G03B 21/56 |

* cited by examiner

PROJECTION SCREEN CONFIGURED TO BE PROJECTED WITH MULTI-ANGLE IMAGES

FIELD OF THE INVENTION

The present invention relates to a projection screen configured to be projected with multi-angle images, and more particularly, to a projection screen configured to be projected with multi-angle images adapted for resisting ambient light.
Introduction In conventional art, a projection screen has been developed that such projection screen can be projected, under an ambience of normal illumination, with high-contrast and brightly colored images. Referring to FIG. 6, a side view illustrating a conventional projection screen, namely a high-visibility projection screen as disclosed in Taiwan Utility Model No. M374077U1, the projection screen comprises an optical film 92 including a light-absorbing surface 921 having a light-absorbing layer 922, and an acting surface 923 having a reflection layer 924. Thereby, brightness and uniformity of images can be enhanced, and a clear image of projection can be viewed by the audience.

Nevertheless, in order to increase the ambient light shielding, the conventional art sacrifices most of the projection angles. That is to say, in the conventional art, a projection apparatus 95 can only be disposed at a single projecting direction, without the possibility of changing the projection angle. Moreover, in the conventional art, the reflection layer 924 and the light-absorbing layer 922 are exposed on the surface of the optical film 92. Therefore, the reflection layer 924 and the light-absorbing layer 922 easily suffer wear and tear due to the handling of users, and this will reduce significantly the lifespan of the projection screen.

Given the above, in an attempt to solve the problem, as mentioned above, research and experiments for a "Projection Screen Configured to be Projected with Multi-Angle Images" has been undertaken, eventually resulting in accomplishment of the present invention.

SUMMARY OF THE INVENTION

An object of the present invention is to provide a projection screen configured to be projected with multi-angle images, such that in addition to maintaining the capability of resisting ambient light, the projection screen, according to the present invention, can be projected with multi-angle images through the help of base membranes and coating layers. Besides, it is possible to prevent the coating layers from contact and abrasion by human behaviors when in use, and as such, the life of use can be prolonged.

To achieve the above-mentioned object, the projection screen configured to be projected with multi-angle images, according to the present invention, comprises a base membrane and a coating layer. The base membrane includes a body layer and a plurality of toothed portions connected with the body layer. A profile of each of the toothed portions includes at least one first plane and at least one second plane, where the first plane and the second plane each has a reflection angle different from each other, for providing multi-angle images of projection. The coating layer includes a reflection layer and a light-absorbing layer. The reflection layer is disposed on the profile of each of the toothed portions for reflecting the light of projected images to users; whereas the light-absorbing layer is disposed on the reflection layer for absorbing and blocking ambient light.

According to the present invention, the coating layer has a structural feature such that, as viewed from a projection position, the coating layer is disposed behind the base membrane. Namely, the user cannot contact the coating layer easily from the surface of the base membrane. This will prevent the coating layer from contact and abrasion by human behaviors when in use, and as such, the life of use can be prolonged.

Further, according to the present invention, the profile of each of the toothed portions is formed with a diffusion layer having a surface optical microstructure, through chemical wet etching or physical dry etching, such that the treated optical microstructure surface can make the light achieve a diffuse effect at specific angles. This will make the light of projected images at various angles be all reflected to the vision of the user without difficulties.

Still further, according to the present invention, the reflection layer may be made of high reflective material such as aluminum, silver, chromium, nickel, or tin, and is disposed on the diffusion layer. The light-absorbing layer may be formed by mixing resin with a black pigment. Therefore, the reflection layer can reflect the light of projected images genuinely to the users through the high reflective material. Whereas, the light-absorbing layer, formed by mixing resin with a black pigment, can absorb and block the ambient light and make the ambient light unable to be reflected to the users.

According to the present invention, the projection position includes a first projection position for providing a reflection layer of the at least one first plane to be reflected to the user, and a second projection position for providing a reflection layer of the at least one second plane to be reflected to the user. As such, the user can determine the positions of light incidence based on the slope of the first plane and on the relationship between incidence angles and reflection angles. Alternatively, an image-projection-light can be emitted horizontally, and be reflected to the user through the reflection layer of the at least one second plane.

Further, according to the present invention, the base membrane may relate to a transparent plastic membrane. As such, the coating layer can be disposed behind the base membrane, and that the image-projection-light can penetrate, back and forth, through the base membrane prior to, and after, the reflection, so as to achieve the purpose of image reflection.

Other objects, advantages, and novel features of the invention will become more apparent from the following detailed description when taken in conjunction with the accompanying drawings.

DETAILED DESCRIPTION OF THE EMBODIMENTS

Figure 1:
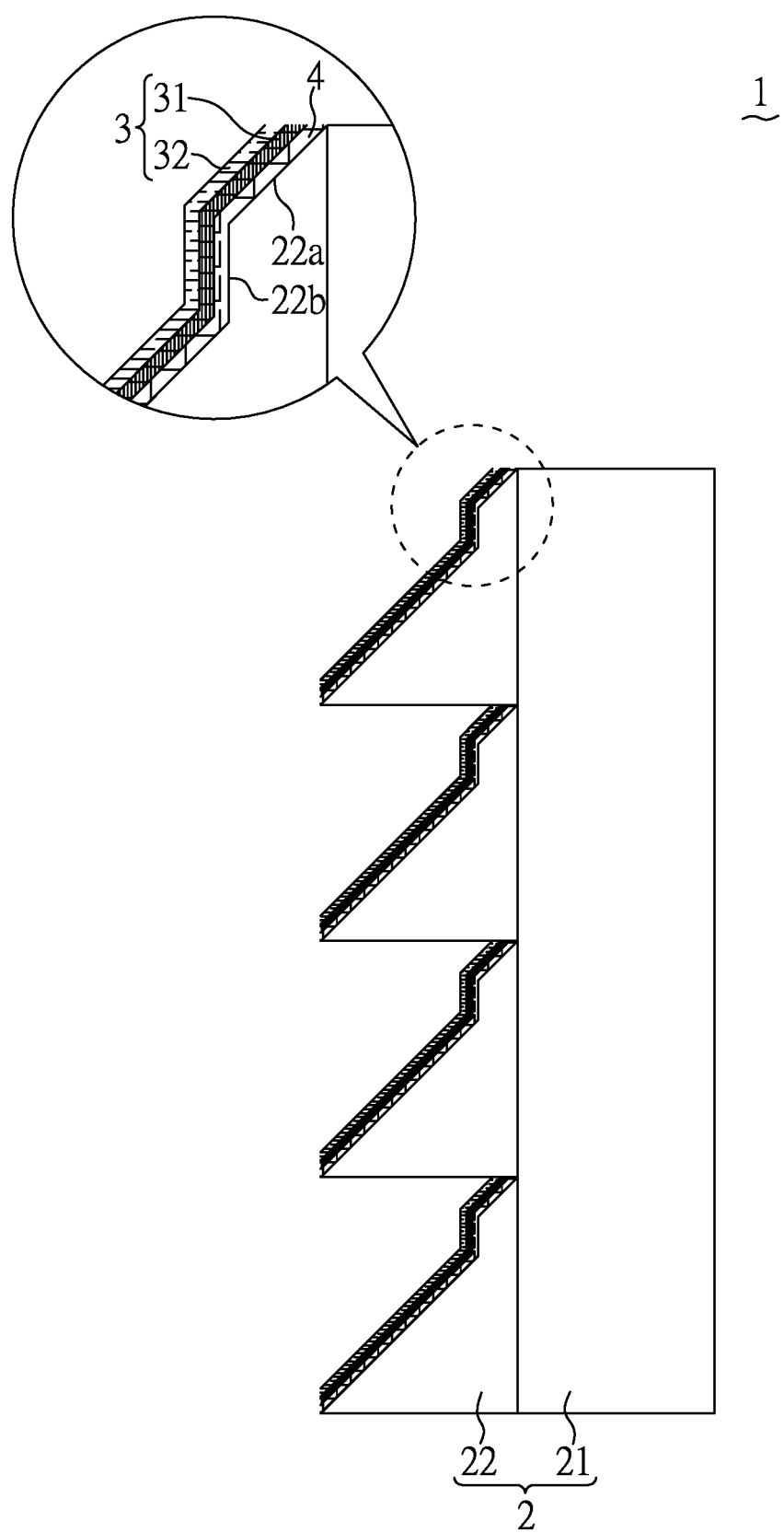
FIG. 1 is a side view illustrating a projection screen configured to be projected with multi-angle images according to a first embodiment of the present invention.

Referring to FIG. 1, a side view illustrating a projection screen configured to be projected with multi-angle images according to a first embodiment of the present invention, the projection screen 1 comprises a base membrane 2 and a coating layer 3. In the present embodiment, the base membrane 2 may be a transparent plastic membrane such as polyester membrane, polycarbonate membrane, or ABS ester (a heteropolymer of Acrylonitrile, Butadiene, and Styrene), and includes a body layer 21 and a plurality of toothed portions 22 connected with the body layer 21. In the present embodiment, there are four toothed portions 22 and that the number of the toothed portions 22 is not limited but can be adjusted according to the size and shape of the body layer 21. Each of the toothed portions 22 has a profile including two first planes 22a and a second plane 22b, for providing reflection surfaces and light-absorbing surfaces of multi-angles, so as to facilitate light transmission and image projection. The ratio between the number of the first plane 22a and the second plane 22b may be different according to different designs, and as such, the number of the first plane 22a and number of the second plane 22b are not to be limited to that described herein. Besides, the profile of the toothed portion 22 includes a diffusion layer 4 having a surface optical microstructure, which can be formed by chemical wet etching or physical dry etching. The treated rough surface can provide a light diffusion effect. This allows the light of projected images at various angles to be all reflected back to the viewpoint of the user.

According to the first embodiment, the coating layer 3 includes a reflection layer 31 and a light-absorbing layer 32. In the present embodiment, the reflection layer 31 is made of highly reflective material such as aluminum, silver, chromium, nickel, or tin, and is disposed on the diffusion layer 4. Because the reflection layer 31 has a sufficiently high reflectance, the light of projected images can be faithfully reflected to the users so as to achieve the purpose of projecting images. Further, the light-absorbing layer 32 is formed by mixing resin with a black pigment. For example, in the present embodiment, the black pigment is mixed with acrylic resin. This will provide the light-absorbing layer 32 a desirable absorbance so as to absorb and block ambient light, rather than reflecting it to the users. Therefore, according to the present invention, images can be projected on the projection screen without ambient light shielding.

Figure 2A:
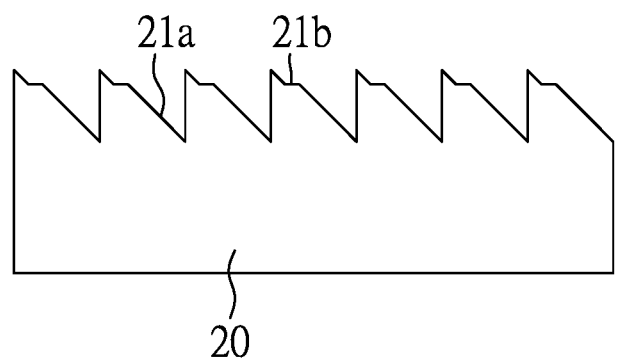
FIG. 2A, FIG. 2B, and FIG. 2C are diagrams illustrating a manufacturing process of the projection screen configured to be projected with multi-angle images according to the first embodiment of the present invention.
Figure 2B:
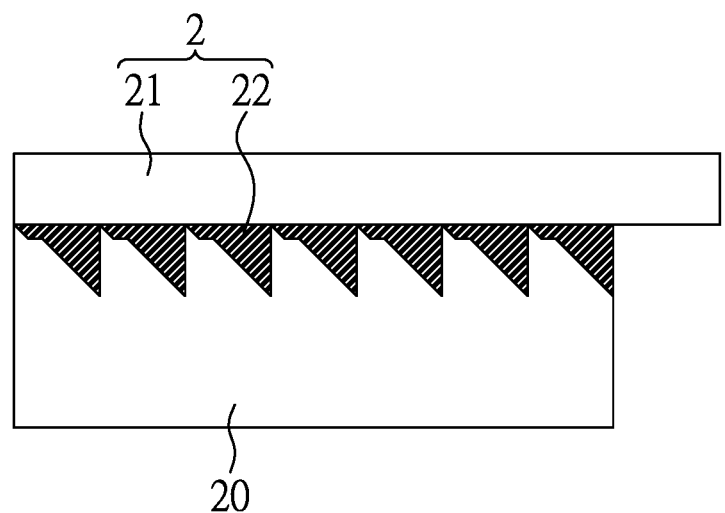
Figure 2C:
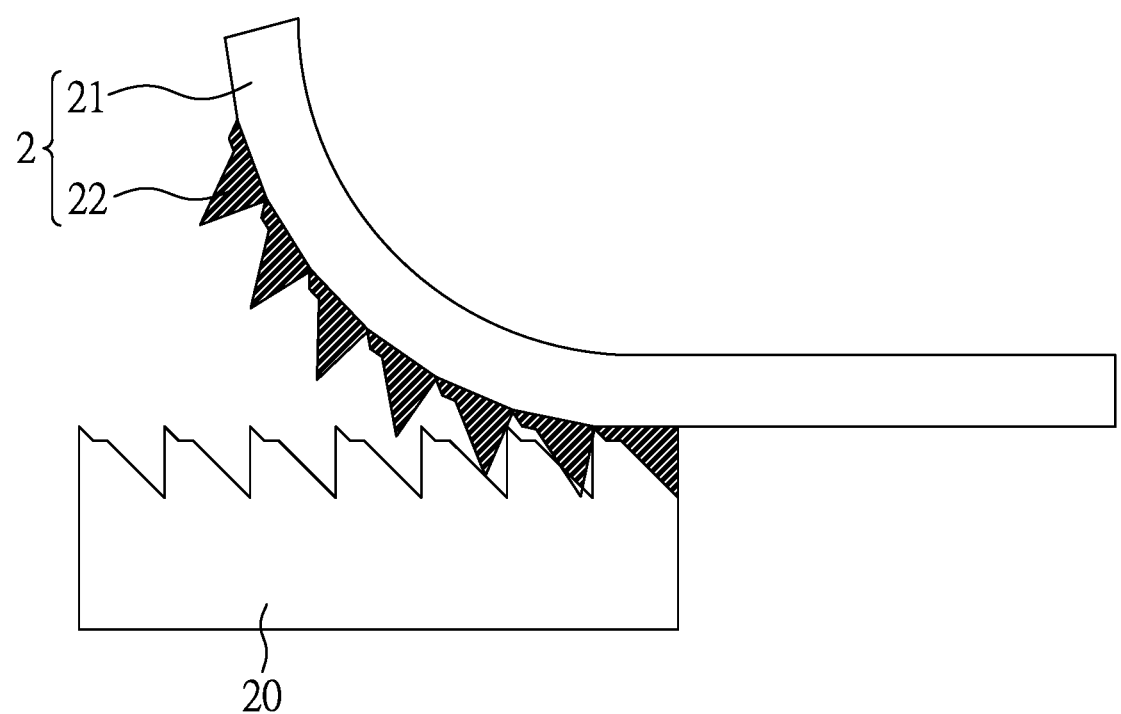

Further, referring to FIG. 2A, FIG. 2B, and FIG. 2C, these diagrams illustrate a manufacturing process of the projection screen configured to be projected with multi-angle images according to the first embodiment of the present invention. In FIG. 2A, a mold 20 is defined with a structural profile for each of the toothed portion 22, for example, using a diamond tool or other cutting tools, and that the gradient and the number of the first planes 22a and of the second plane 22b are determined, so as to complete an initial step for manufacturing the mold 20. Subsequently, a micro treatment is made to the profile of each of the toothed portions 22 using photolithography. In the present embodiment, the external profile of each of the toothed portions 22 is formed as the diffusion layer 4 having a surface optical microstructure, through chemical wet etching or physical dry etching, so as to achieve a light diffusion effect.

Still further, as shown in FIG. 2B, in order to obtain the shape of the first planes 22a and of the second plane 22b, the mold 20 is filled with a light-cured transparent resin, and then the body layer 21 covers thereon. After the gas inside the mold 20 has been released and that the transparent resin been pressed to an appropriate thickness, the filled transparent resin will conform to the mold 20 sufficiently. At this moment, the resin is exposed to a specific wavelength of light that causes an internal polymerization reaction in the resin such that a cured structure is formed. Eventually, as shown in FIG. 2C, the light-cured transparent resin forms the toothed portions 22 of the base membrane 2. During a demolding process, the toothed portions 22 are released from the mold 20, together with the body layer 21 so as to complete the fabrication of the base membrane 2.

According to the present embodiment, for the coating layer 3, the reflection layer 31 may cover the exposed profile of the toothed portions 22, for example, by way of vacuum evaporation, vacuum sputtering, or coating so as to fully envelop the portions of the first planes 22a and of the second plane 22b. Such that the light of projected images can be faithfully reflected to the users. Finally, the light-absorbing layer 32 covers the reflection layer 31, for example, by coating the light-absorbing layer 32 on the reflection layer 31, such that the outermost layer of the structure can absorb the ambient light coming from outside, and that the projection screen 1 can be used for image projection without the need for shielding ambient light.

Figure 3:
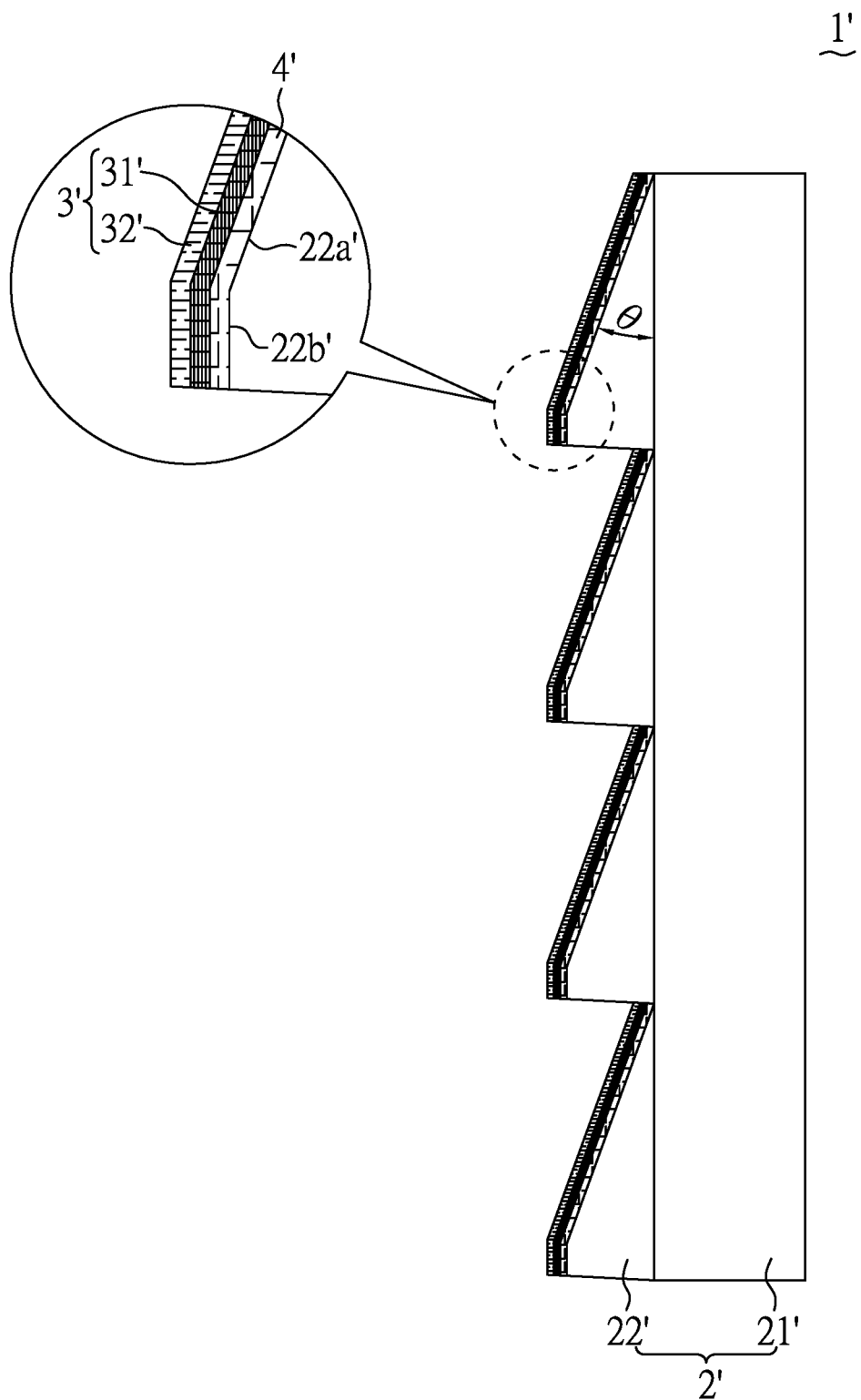
FIG. 3 is a side view illustrating a projection screen configured to be projected with multi-angle images according to a second embodiment of the present invention.

Now referring to FIG. 3, a side view illustrating a projection screen configured to be projected with multi-angle images according to a second embodiment of the present invention, another projection screen 1' for projecting multi-angle images is disclosed. In the second embodiment, the basic structure is similar to that of the first embodiment, and comprises a base membrane 2' and a coating layer 3'. The base membrane 2' includes a body layer 21' and a plurality of toothed portions 22' connected with the body layer 21'. In the second embodiment, four exemplary toothed portions 22' are shown in FIG. 3. However, the number of the toothed portions 22' is not limited as shown, but may be adjusted according to the size and shape of the body layer 21'. Each of the toothed portions 22' has a profile including two first planes 22a' and a second plane 22b', for providing reflection surfaces and light-absorbing surfaces of multi-angles, so as to facilitate light transmission and image projection. Further, in the second embodiment, the coating layer 3' and, as well, a diffusion layer 4' are defined as similar to those of the first embodiment. For example, the coating layer 3' includes a reflection layer 31' and a light-absorbing layer 32', while the diffusion layer 4' provides a rough surface having a surface optical microstructure formed by chemical wet etching or physical dry etching. The second embodiment, however, has a more optimal configuration of profile, such that the first planes 22a' has a reflection angle of 20 degrees, for example, within a range of 15 to 25 degrees. This will provide the present invention a superior effect of projection, bringing the images completely into eyes of the users.

Figure 4:
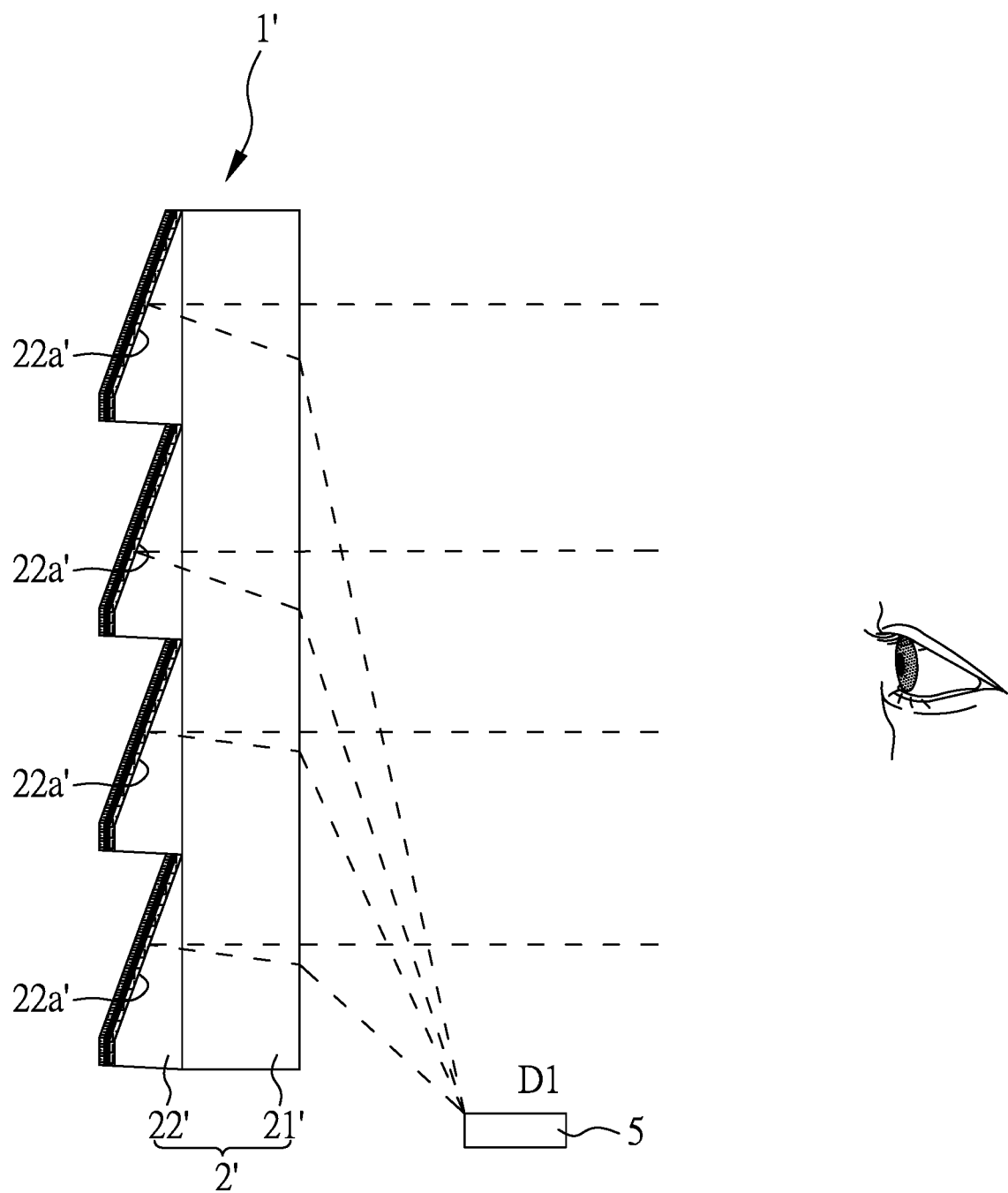
FIG. 4 is a schematic drawing illustrating a first projection position of the projection screen configured to be projected with multi-angle images according to the second embodiment of the present invention.
Figure 5:
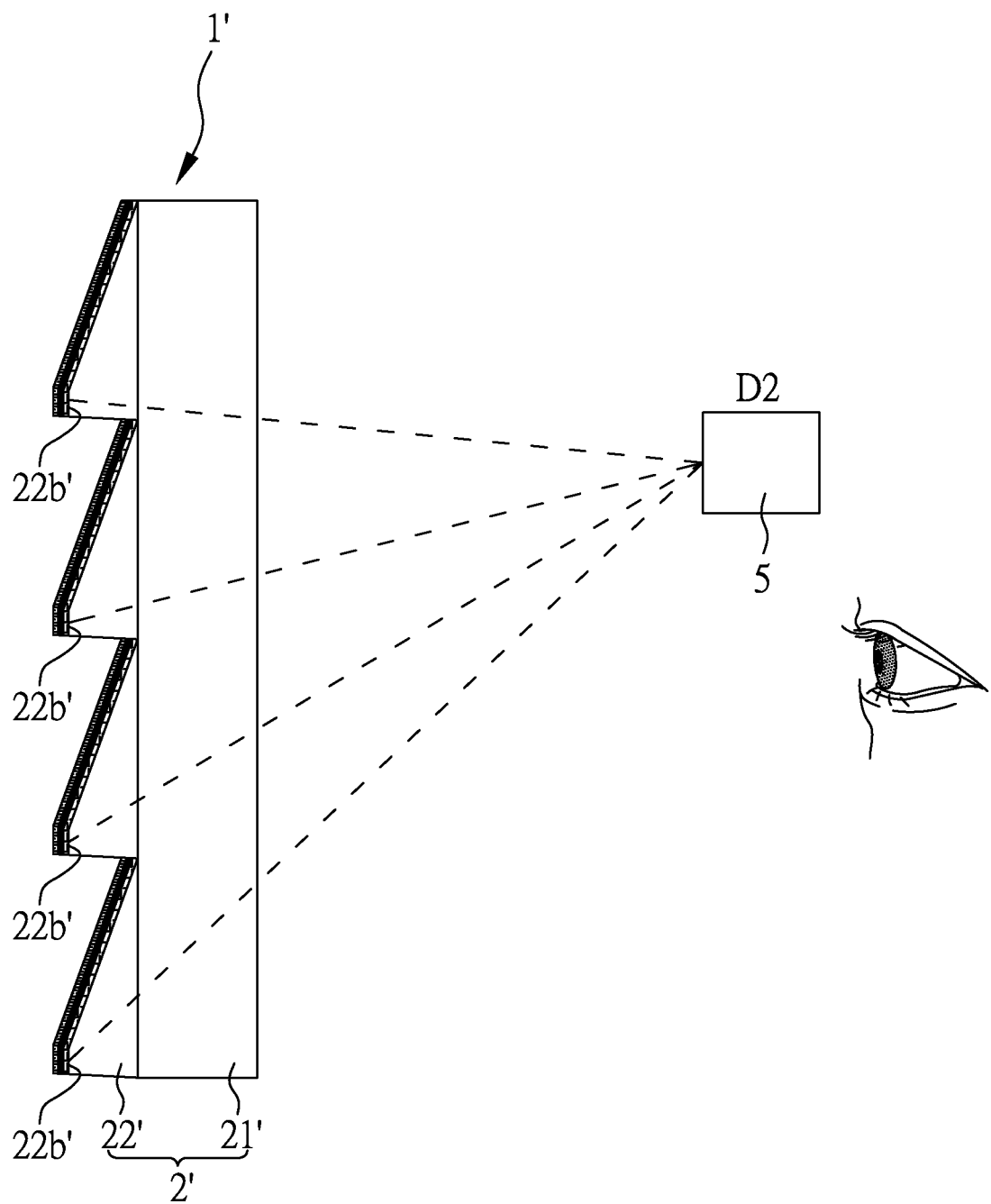
FIG. 5 is a schematic drawing illustrating a second projection position of the projection screen configured to be projected with multi-angle images according to the second embodiment of the present invention.
Figure 6:
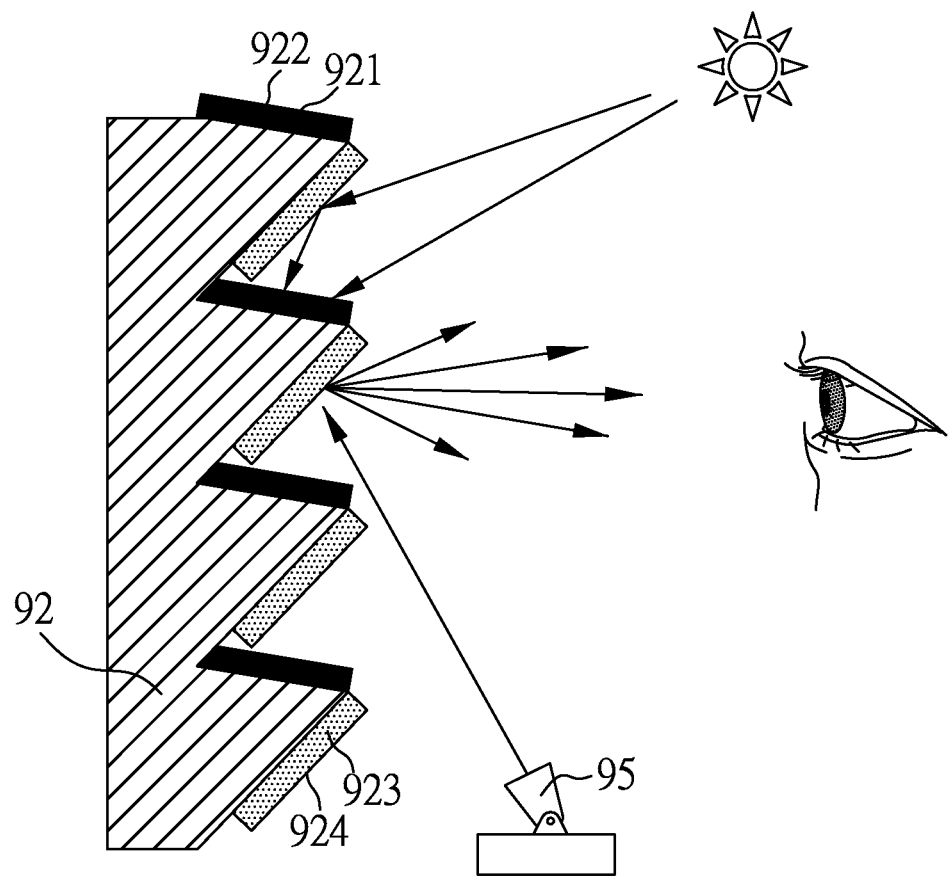
FIG. 6 is a side view illustrating a conventional projection screen.

Further, references are made to FIG. 4, a schematic view illustrating a first projection position of the projection screen configured to be projected with multi-angle images according to the second embodiment of the present invention; and FIG. 5, a schematic view illustrating a second projection position of the projection screen. As shown in FIG. 4, when a projection device 5 is disposed at the first projection position D1, the image-projection-light (indicated by the dash lines in the figure) emitting from the projection device 5 is reflected by the reflection layers 31' of the first planes 22a'. As such, the first projection position. D1 will determine the positions of light incidence based on the slopes of the first planes 22a' and on the relationship between incidence angles and reflection angles. In another example, even if the first planes 22a' are arranged in a manner of negative slopes, the first position D1 may be moved above the vision of the user, which, of course, should not be limited by the figure as shown.

Still further, as shown in FIG. 5, when the projection device 5 is disposed at the second projection position D2, the image-projection-light emitting from the projection device 5 is reflected by the reflection layers 31' of the second plane 22b'. As such, the image-projection-light from the projection device 5 can be emitted substantially horizontally, and be reflected to the user through the reflection layers 31' of the second planes 22b', so as to achieve the purpose of projecting images.

Given the above, it should be noted that in either projection position D1 or D2, the coating layer 3 or 3' is always disposed behind the base membrane 2 or 2'. Therefore, through such design, the coating layers 3 or 3' can be prevented from contact and abrasion by human behaviors when in use, and as such, the lifespan of the projection screen can be prolonged.

Although the present invention has been explained in relation to its exemplary embodiments, it is to be understood that many other possible modifications and variations can be made without departing from the scope of the invention as hereinafter claimed.

What is claimed is:

1. A projection screen configured to be projected with multi-angle images, comprising:
   a base membrane, including a body layer and a plurality of toothed portions connected with the body layer, wherein a profile of each of the toothed portions includes at least one first plane and at least one second plane, and wherein the first plane and the second plane each has a reflection angle different from each other; and
   a coating layer including a reflection layer and a light-absorbing layer, wherein the reflection layer is disposed on each of the toothed portions, and the light-absorbing layer is disposed on the reflection layer, and
   a diffusion layer on the profile of each of the toothed portions, the diffusion layer having a surface optical microstructure for diffusing light,
   wherein, as viewed from a projection position, the coating layer is disposed behind the base membrane for preventing the coating layer from contact and abrasion by human behaviors when in use.

2. The projection screen configured to be projected with multi-angle images as claimed in claim 1, wherein the diffusion layer is formed through chemical wet etching or physical dry etching.

3. The projection screen configured to be projected with multi-angle images as claimed in claim 1, wherein the reflection layer comprises a high reflective material selected from the group consisting of aluminum, silver, chromium, nickel, and tin.

4. The projection screen configured to be projected with multi-angle images as claimed in claim 1, wherein the light-absorbing layer is formed by mixing resin with a black pigment.

5. The projection screen configured to be projected with multi-angle images as claimed in claim 1, wherein the projection position includes a first projection position for providing a reflection layer of the at least one first plane to be reflected to a user, and a second projection position for providing a reflection layer of the at least one second plane to be reflected to the user.

6. The projection screen configured to be projected with multi-angle images as claimed in claim 1, wherein the base membrane comprises a transparent plastic membrane.

7. The projection screen configured to be projected with multi-angle images as claimed in claim 1, wherein the first plane has a reflection angle within a range of about 15 degrees to about 25 degrees.

* * * * *